United States Patent
Ota (10) Patent No.: US 10,220,858 B2
(45) Date of Patent: Mar. 5, 2019

(54) RISK INDEX TRANSFORMATION APPARATUS

(71) Applicant: DENSO CORPORATION, Kariya, Aichi-pref. (JP)

(72) Inventor: Kazuhiro Ota, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/762,731

(22) PCT Filed: Aug. 31, 2016

(86) PCT No.: PCT/JP2016/075467
§ 371 (c)(1),
(2) Date: Mar. 23, 2018

(87) PCT Pub. No.: WO2017/051676
PCT Pub. Date: Mar. 30, 2017

(65) Prior Publication Data
US 2018/0354529 A1 Dec. 13, 2018

(30) Foreign Application Priority Data
Sep. 25, 2015 (JP) .................. 2015-188164

(51) Int. Cl.
*B60Q 1/00* (2006.01)
*B60W 50/14* (2012.01)
(Continued)

(52) U.S. Cl.
CPC ........ *B60W 50/14* (2013.01); *B60W 50/0097* (2013.01); *G07C 5/085* (2013.01); *B60W 2050/143* (2013.01)

(58) Field of Classification Search
CPC .................................. B60Q 1/00; B60Q 50/14
(Continued)

(56) References Cited

U.S. PATENT DOCUMENTS

| 2011/0282559 A1 | 11/2011 | Isaji et al. |
| 2012/0288198 A1 | 11/2012 | Tojo et al. |

(Continued)

FOREIGN PATENT DOCUMENTS

| JP | H08036698 A | 2/1996 |
| JP | 2007280263 A | 10/2007 |

(Continued)

OTHER PUBLICATIONS

Takahiro Wada et al., "Comfortable Brake Assist System based on Analysis of Expert Driver's Behaviors", Denso Technical Review, 2010, vol. 15, pp. 95-100.
(Continued)

*Primary Examiner* — Tai T Nguyen
(74) *Attorney, Agent, or Firm* — Harness, Dickey & Pierce, P.L.C.

(57) ABSTRACT

A risk index transformation apparatus includes a state acquisition portion, an index calculation portion, an index transformation portion, and a support method determination portion. The state acquisition portion acquires a vehicle state. The index calculation portion calculates the risk index based on the vehicle state acquired by the state acquisition portion. The index transformation portion performs a correction operation to transform the risk index calculated by the index calculation portion using a threshold value and a value of a continuous function that continuously changes with reference to the threshold value. The support method determination portion controls a device to execute a support method based on the risk index transformed by the index transformation portion using the correction operation. The support method includes a display of warning in multiple levels, an output of alarm sound in multiple levels, or an operation restriction of a navigation device.

2 Claims, 5 Drawing Sheets

(51) Int. Cl.
*G07C 5/08* (2006.01)
*B60W 50/00* (2006.01)

(58) Field of Classification Search
USPC ............... 340/425.5, 435, 436, 438, 905
See application file for complete search history.

(56) References Cited

U.S. PATENT DOCUMENTS

| 2013/0113910 A1* | 5/2013 | Kim | ............ | B60K 28/066 |
| | | | | 348/77 |
| 2015/0166058 A1* | 6/2015 | Mizutani | ............ | B60W 50/14 |
| | | | | 701/1 |
| 2015/0375756 A1* | 12/2015 | Do | ............ | B60W 50/14 |
| | | | | 701/1 |

FOREIGN PATENT DOCUMENTS

| JP | 2011123003 A | 6/2011 |
| JP | 2011255876 A | 12/2011 |
| JP | 2012238175 A | 12/2012 |

OTHER PUBLICATIONS

Naohiko Tsuru et al., "Analysis of Visual Cognitive Functions while Driving and an Approach to Driver Modeling", Denso Technical Review, 2007, vol. 12 No. 1, pp. 130-136.

* cited by examiner

RISK INDEX TRANSFORMATION APPARATUS

CROSS REFERENCE TO RELATED APPLICATIONS

This application is a U.S. National Phase Application under 35 U.S.C. 371 of International Application No. PCT/JP2016/075467 filed on Aug. 31, 2016 and published in Japanese as WO 2017/051676 A1 on Mar. 30, 2017. This application is based on and claims the benefit of priority from Japanese Patent Application No. 2015-188164 filed on Sep. 25, 2015. The entire disclosures of all of the above applications are incorporated herein by reference.

TECHNICAL FIELD

The present disclosure relates to a risk index transformation apparatus that sets a risk index used for safe driving.

BACKGROUND ART

Recently, a drive assist apparatus that supports a vehicle driving has been developed. This type of drive assist apparatus may evaluate a risk index using various types of sensor information when a subject vehicle follows a front vehicle, and then perform a drive assist (for example, notification of risk degree or brake control) based on the risk index. Conventionally, applicant of the present application proposed a performance index for approach and alienation as the risk index. The performance index for approach and alienation evaluates an approach state between the subject vehicle and the front vehicle (see, e.g., Patent Literature 1). The performance index for approach and alienation evaluates the approach and alienation state by setting a virtual front vehicle. With the configuration, speed control can be performed without giving discomfort to a user even when the front vehicle does not exist.

PRIOR ART LITERATURE

Patent Literature

Patent Literature 1: JP 2011-255876 A

SUMMARY OF INVENTION

A value of the above-described risk index may increase with an increase of a risk degree. The risk index increases with a decrease of distance between a subject vehicle and the front vehicle. The risk index is consecutively evaluated based on the distance between the subject vehicle and the front vehicle. Thus, the configuration in which the risk index is consecutively evaluated and informed is not suitable for a configuration in which the risk index is required to be notified to the driver in predetermined multiple risk levels.

The configuration in which the risk index is required to be notified to the driver in the predetermined multiple risk levels may include a configuration in which the risk degree is notified in the multiple levels of high, middle and low which are shown by red, yellow and green, respectively, like a traffic signal. In order to divide the risk index in the multiple levels, a threshold value may be defined. The risk index is changeable corresponding to various types of factors, such as recognition determination of the risk degree by the driver, a feeling of drive, or a driving skill. Thus, in the defining of the threshold value, it is difficult to divide the risk degree in high, middle and low based on the threshold value corresponding to the various types of factors related to the driver.

When the driver drives the vehicle, a situation in which the driver does not face danger but the danger gradually approaches is considered. This situation may occur when the driver of the subject vehicle has a remaining time until a collision with a front vehicle, but a distance between the subject vehicle and the front vehicle is gradually shortened and there is a risk of the collision. In this case, the driver does not suddenly feel dangerous, but gradually feels dangerous. In this case, expressing the risk continuously is more appropriate to match feeling of the driver compared with expressing the risk in multiple levels using the threshold value. A warning manner changes in various types based on a driver's request, and setting of a proper risk index is required.

In view of the foregoing difficulties, it is an object of the present disclosure to provide a risk index transformation apparatus capable of setting a proper risk index.

According to an aspect of the present disclosure, a risk index transformation apparatus, which sets a risk index for a drive assist, includes a state acquisition portion, an index calculation portion, and an index transformation portion. The state acquisition portion acquires a vehicle state. The index calculation portion calculates the risk index based on the vehicle state acquired by the state acquisition portion. The index transformation portion performs a correction operation to transform the risk index calculated by the index calculation portion using a threshold value and a value of a continuous function that continuously changes with reference to the threshold value. With this configuration, the risk index can be transformed into a value that continuously changes using the continuous function. Thus, the proper risk index can be set.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, embodiments of a risk index transformation apparatus will be described with reference to the drawings. In each embodiment, portions corresponding to items described in the preceding embodiment are denoted by the same reference symbols, and their repetitive description might be omitted. In the embodiments, sections that are different from the preceding embodiment will be mainly described.

First Embodiment

Figure 1:
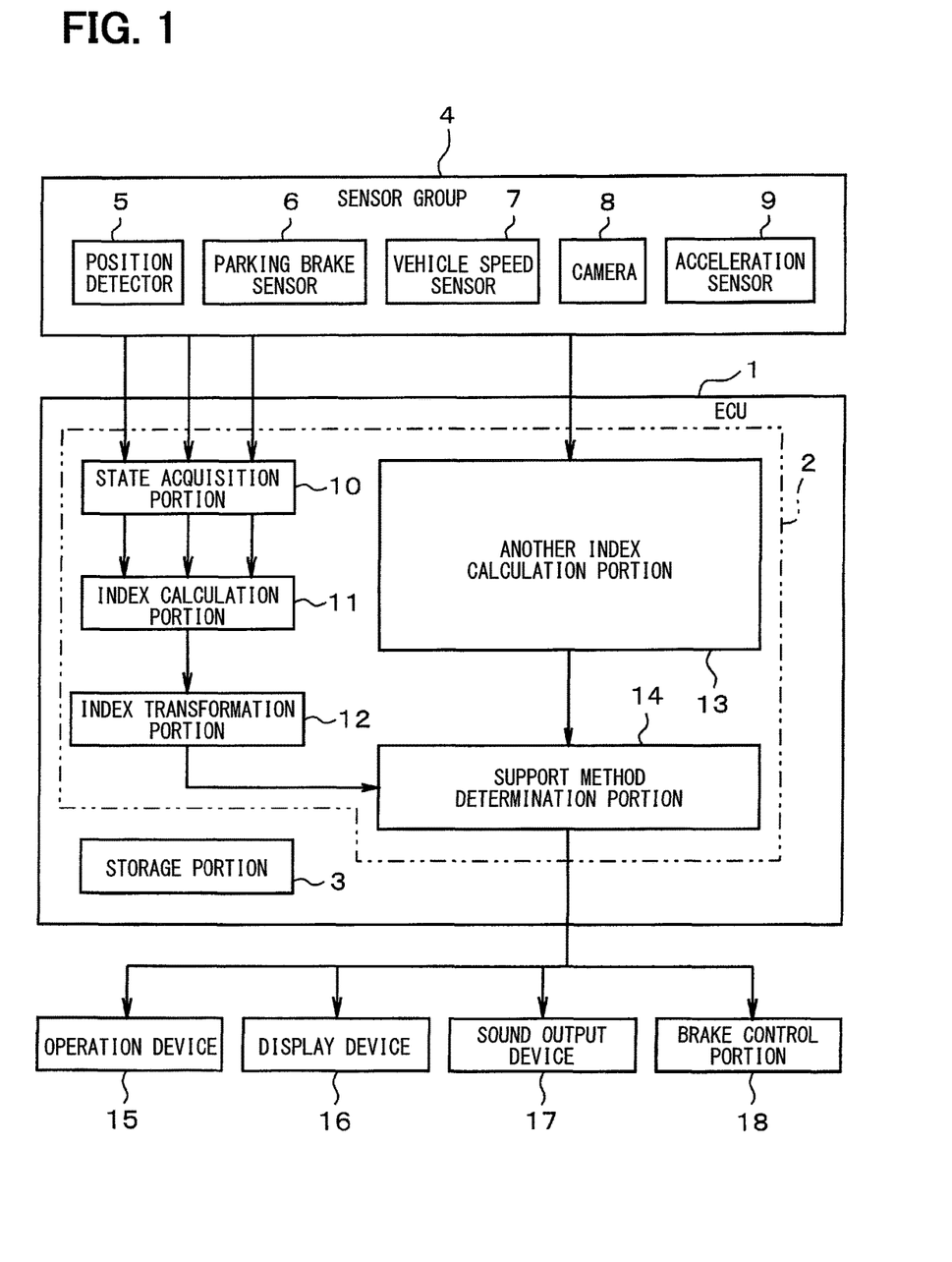
FIG. 1 is a block diagram schematically showing an electrical configuration according to a first embodiment of the present disclosure.

FIG. 1 schematically shows an electrical configuration of an electronic control unit (ECU: Electronic Control Unit) 1 that functions as the risk index transformation apparatus and a drive assist apparatus. As shown in FIG. 1, the electronic control unit 1 may be mainly provided by a microcomputer that includes a control circuit 2 and a storage portion 3. The control circuit 2 may be mainly provided by a CPU. The storage portion 3 may be provided by a non-transitory tangible storage medium. The electronic control unit 1 executes a method corresponding to a program stored in the storage portion 3 by running the program. The storage portion 3 may include a RAM, a ROM, and an EEPROM. A part of or all functions executed by the electronic control unit 1 may be configured by one or more ICs in hardware manner. The electronic control unit 1 is connected to a sensor group 4. The sensor group 4 may include a position detector 5, a parking brake sensor 6, a vehicle speed sensor 7, a camera 8, or an acceleration sensor 9. The position detector 5 detects a position using GPS. The parking brake sensor 6 detects an operation state of the parking brake. The vehicle speed sensor 7 detects a speed of the subject vehicle. The camera 8 is attached to a periphery of the vehicle and captures images around the vehicle. The acceleration sensor 9 detects acceleration of the vehicle. The sensor group 4 may include a wearable sensor that detects a driving load of a driver. The vehicle speed sensor 7 is capable of detecting the speed of the subject vehicle.

The control circuit 2 of the electronic control unit 1 includes a state acquisition portion 10, an index calculation portion 11, an index transformation portion 12, another index calculation portion 13, and a support method determination portion 14. The control circuit 2 executes a corresponding program stored in the storage portion 3 in order to provide these portions as functional blocks with a hardware circuit as main configuration. The state acquisition portion 10 calculates various types of information, such as a subject vehicle's velocity Vo, a distance D, or a relative velocity Vr based on sensor information acquired from the sensor group 4, and then acquires the information as a vehicle state. The state acquisition portion 10 calculates the subject vehicle's velocity Vo based on information from the vehicle speed sensor 7. The state acquisition portion 10 calculates the distance D between the subject vehicle and a front vehicle and the relative velocity Vr to the front vehicle based on information from the sensor group 4, such as the vehicle speed sensor 7, the camera 8, and the acceleration sensor 9.

The index calculation portion 11 calculates a risk index based on the vehicle state acquired by the state acquisition portion 10. The index transformation portion 12 performs a correction operation to transform the risk index calculated by the index calculation portion 11 using a threshold value and a value of a continuous function (for example, a probability density function or a cumulative distribution function). The value of the continuous function continuously changes with reference to the threshold value. Another index calculation portion 13 calculates another index for determining a support method except for the index that is calculated by the index calculation portion 12, and then outputs a calculated result to the support method determination portion 14. The support method determination portion 14 determines the support method based on the values calculated by the index transformation portion 12 and another index calculation portion 13. The electronic control unit 1 is connected to an operation device 15, a display device 16, a sound output device 17, and a brake control portion 18. The support method determination portion 14 determines the support method that each device 15 to 18 executes.

The operation device 15 is provided for inputting various type of information using a touch panel that is provided on a screen of the display device 16, a mechanical switch, or the like. The operation device 15 is provided for operating a navigation function of the navigation device that is not shown in figures.

The display device 16 may be provided by a liquid crystal color display, and shows various types of information (for example, warning information) in response to a command output from the control circuit 2 of the electronic control unit 1. The sound output device 17 may be provided by a speaker and outputs various types of sounds (for example, alarm sound or alarm voice) in response to a command output from the control circuit 2 of the electronic control unit 1. The brake control portion 18 may be the block executing hydraulic control of brake oil and controls a brake in response to a command output from the control circuit 2 of the electronic control unit 1.

The operation of the above-described configuration will be described with reference to the flowchart shown in FIG. 2. In the present embodiment, the value that is transformed by the correction operation using the value of the continuous function, which continuously changes with reference to the threshold value, is set as a calculated risk index.

Figure 2:
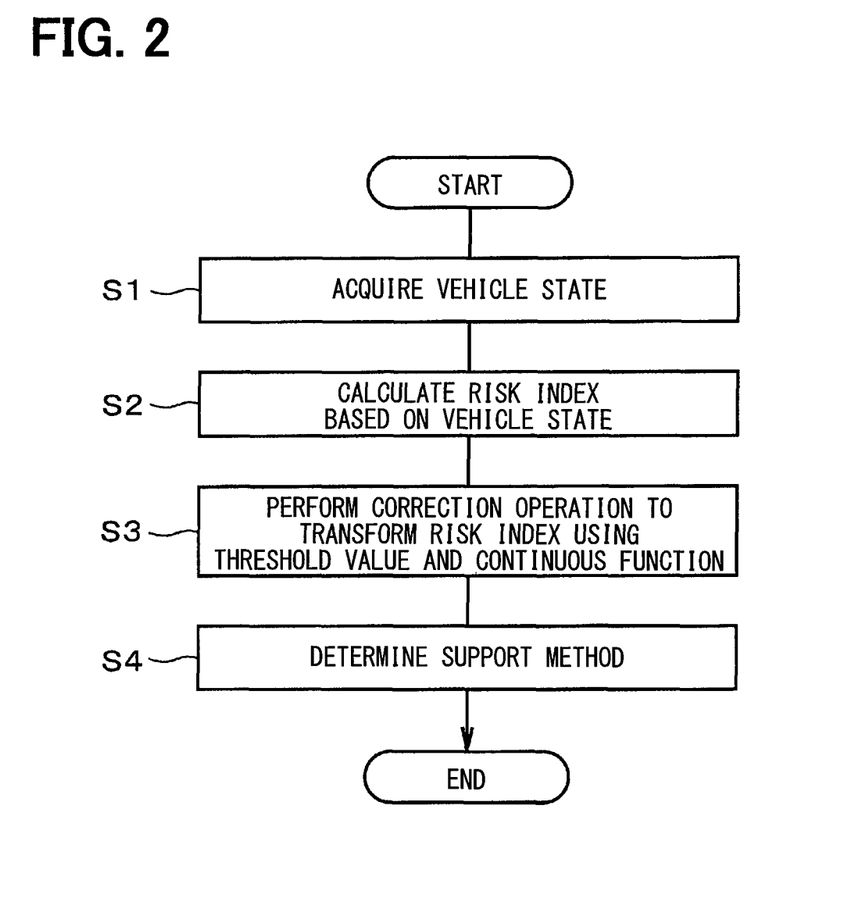
FIG. 2 is a flowchart schematically showing an operation.

As shown in FIG. 2, in step S1, the state acquisition portion 10 acquires the information of the subject vehicle state, such as the subject vehicle's velocity Vo, the distance D, or the relative velocity Vr to the front vehicle based on the sensor information output from the sensor group 4. In step S2, the index calculation portion 11 calculates the risk index based on the vehicle state. For example, as the risk index calculated in step S2, a collision risk perception index KdB defined by the following equation 1 may be calculated. The risk perception index KdB is also known as a performance index for approach and alienation.

[Equation 1]

$$K_{dB} = \begin{cases} 10\log_{10}\left(\left|4 \times 10^7 \times \dfrac{V_r}{D^3}\right|\right)\mathrm{sgn}(-V_r) & (|4 \times 10^7 \times V_r/D^3| \geq 1) \\ 0 & (|4 \times 10^7 \times V_r/D^3| < 1) \end{cases} \quad (1)$$

The collision risk perception index KdB is calculated using the distance D and the relative velocity Vr. The collision risk perception index KdB with the front vehicle increases with a decrease of the distance D. That is, the value of the risk index increases. The risk index calculated in step S2 is not limited to the collision risk perception index KdB. Alternatively, a value that formulates an index of personal feeling may be used as the risk index. Alternatively, the distance D may be used as the risk index instead of the risk perception index KdB. A calculated value of the driving load of the driver which is detected by the wearable sensor or the like, TIC (Time To Collision), or a multiplex index that combines the indexes in a predetermined rule may be employed as the risk index. A brake discriminant that is calculated from a front vehicle's velocity Vp, the relative velocity Vr, and the distance D may be employed as the risk index.

In the risk index, the threshold value, which may represent a boundary for danger, is previously defined. The threshold value is stored in the storage portion 3. Hereinafter, a concept of the threshold value will be described. The threshold value represents a criterion that indicates whether the driver may feel in danger when the driver drives the subject vehicle. The threshold value may represent a criterion for displaying the risk degree in multiple levels on the display device 16, outputting the alarm sound in multiple levels from the sound output device 17, and restricting the operation of the operation device 15 and the control of the brake by the brake control portion 18.

Assume that the threshold value differs in individuals due to driving proficiency of each individual. In this case, the threshold value that is changed based on the driving proficiency of each individual may be previously stored in the storage portion 3. Various types of parameters, such as variance which are changed based on a characteristic of each individual may be previously stored in the storage portion 3.

Conventionally, it is considered that when the risk index and the threshold value are defined as a and at, respectively, the risk degree raises one level in case that the risk index a is equal to or more than the threshold value at. In consideration of this configuration, a mathematical formula using a step function is capable of being employed. That is, a function that satisfies 1 under a≥at, and 0 under a<at is capable of being set. When the above-described function is set, the threshold value that is assumed to be different in the individuals directly affects determination of the risk degree. When the risk index is directly employed, for some individuals, the risk degree may be optimistically determined by the personality of the individual or the like even when the risk degree is, in fact, considerably high.

In the present embodiment, in step S3, the index transformation portion 12 performs the correction operation to transform the risk index calculated in step S2 using the continuous function whose value continuously changes with reference to the threshold value. A normal distribution, the probability density function, or the cumulative distribution function is employed as the continuous function. The normal distribution is known as a Gaussian distribution. The probability density function may include a log-normal distribution. The cumulative distribution function may include a cumulative density function of the normal distribution or the probability density function, or a sigmoid function that has a similar characteristic to the cumulative density function. The drivers can be categorized in various types. Some drivers determine the risk degree carefully and others determine the risk degree roughly. Thus, this transformation is suitable for mainly considering adjusting to a sense that the drivers averagely feel.

A differentiable function may be employed so as to facilitate formula manipulation or computer processing. Each individual has different characteristic, so the characteristic may be adjusted by using a function that has an inflection point so as to change various kinds of parameters. The function may employ any continuous function that is capable of changing the value continuously.

Figure 3:
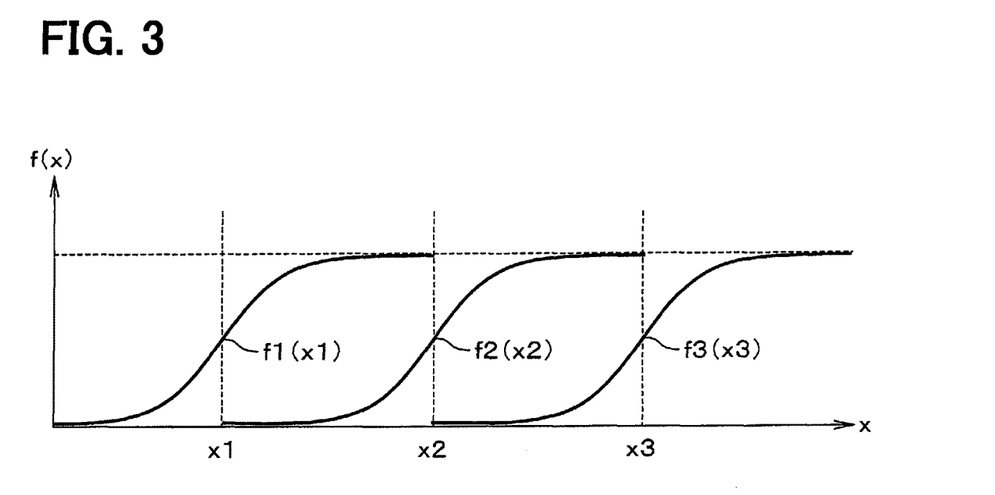
FIG. 3 is a graph showing an example to which a sigmoid function is applied.
Figure 4:
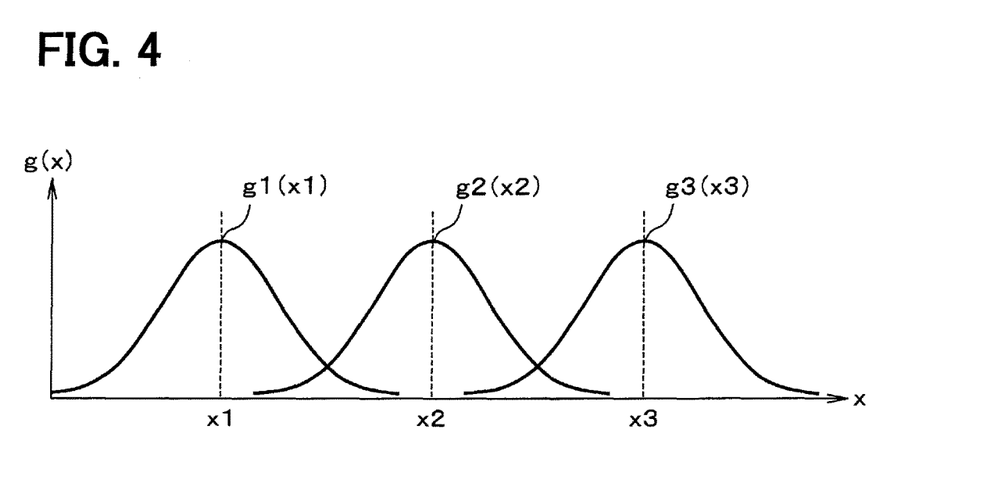
FIG. 4 is a graph showing an example to which a normal distribution is applied.

In FIG. 3 and FIG. 4, the continuous functions, which continuously change with reference to the threshold value, f1(x) to f3(x), and g1(x) to g3(x) (hereinafter, e.g., f1 represents f1(x)) are shown as examples. In FIG. 3, as the example, standard sigmoid functions f1 to f3 are employed as the cumulative distribution functions. In FIG. 4, as the example, the normal distribution functions g1 to g3, which are the Gaussian distributions, are employed as the probability density functions. In FIGS. 3 and 4, threshold values x1, x2, and x3 are included, and adjacent two of the continuous functions f1 to f3 or g1 to g3 overlap with one another.

When the standard sigmoid functions f1 to f3 shown in FIG. 3 are employed, the risk index a is defined and the sigmoid functions with reference to the threshold value at is capable of being employed. In this case, each sigmoid function is formulated in equation 2. Herein, A represents a gain.

[Equation 2]

$$\frac{1}{1+e^{-(a-a_t)\lambda}} \qquad (2)$$

In FIG. 3, the threshold values at are represented as at=x1, x2, x3. The threshold value at and the gain A are adjusted so that an increase manner along with changing of the risk index a is capable of being expressed from a functional type that is an approximate step function to a functional type that is an approximate straight line. A gradient is capable of being adjusted by multiplying equation 2 by a coefficient. The inflection point is capable of deviating by setting a bias to the threshold value at. Thus, the difference among individuals is capable of being absorbed by properly adjusting the setting of the sigmoid functions f1 to f3. By employing the sigmoid functions f1 to f3, a continuous value can be expressed with the characteristic that changes 0 to 1 gradually.

In areas in which two adjacent sigmoid functions f1, f2, f3 widely overlap, a value may be conclusively obtained by multiplying the value of each function by the coefficient of the corresponding function and then adding the multiplied results. Assume that, in the sigmoid function f1, the threshold value at1=30=x1 is set, and in the sigmoid function f2, the threshold value at2=32=x2 is set. Under this assumption, in equation 2, when a=31, y1=0.622 in case of A=0.5 and y2=0.269 in case of A=1 are obtained. In this case, y=b1×0.622+b2×0.269 is conclusively obtained as the risk index y after the correction operation. Herein, b1, b2 represent scores of the risk indexes which are previously defined corresponding to at1, at2, respectively. The score of the threshold value at1 is defined as b1. The score of the threshold value at2 is defined as b2. In step S3, the correction operation is performed using each score of the corresponding risk index as a weighting coefficient. The risk index has some areas defined by the threshold values a1, a2 as boundaries. With this configuration, the value obtained by the correction operation of the risk index indicates that the risk index belongs to which area among the areas defined by the threshold values a1, a2.

Assume that the probability density function, such as the normal distribution shown in FIG. 4 is employed. In this case, when the risk index a≈31, a probability of occurrence of people who feel that the threshold value at1 is exceeded is capable of being obtained as p1, and a probability of occurrence of the people who feel that the threshold value at2 is exceeded is capable of being obtained as p2. Each probability is multiplied by the corresponding score b1 or b2, and then the results are added. Thus, the conclusive result is calculated by y=b1×p1+b2×p2. The probability density function is capable of being considered as a differential function of a cumulative probability density function.

Assume that a state that the risk index a is less than the threshold value at1 is defined as state A, a state that the risk index a is between the threshold value at1 and the threshold value at2 is defined as state B, and a state that the risk index a is more than the threshold value at2 is defined as state C. In this case, the conclusive value is capable of being defined as a probability that exists in each of the states A to C. That is, when the probability density function is employed, the areas that are divided by the threshold values at1, at2 are regarded as the states A, B, C. The difference among the individuals is absorbed by adjusting the variance that defines the function of the normal distribution.

The support method determination portion 14 of the electronic control unit 1 determines the level of the risk degree (for example, the level may be one of a safe state, a normal state, or a hazardous state) based on the risk index transformed by the correction operation in step S3, and then, in step S4, determines the support method. Alternatively, in step S4, when determining the support method, the support method determination portion 14 may employ another index that is calculated by another index calculation portion 13 in combination with the risk index obtained in step S3.

The support method determination portion 14 of the electronic control unit 1 controls the operation device 15, the display device 16, the sound output device 17, or the brake control portion 18 to perform the determined support method. The display device 16 may display a warning by changing a color or an indicator in multiple levels based on the risk index transformed by the correction operation. The sound output device 17 may output the alarm sound by changing a sound quality, loudness, or speech content in multiple levels based on the risk index transformed by the correction operation. The operation device 15 may restrict the operation of a navigation device based on the risk index transformed by the correction operation. The brake control portion 18 may control the brake based on the risk index transformed by the correction operation.

In the present embodiment, the state acquisition portion 10 acquires the vehicle state. The index calculation portion 11 calculates the risk index based on the vehicle state acquired by the state acquisition portion 10. The index transformation portion 12 performs the correction operation to transform the risk index, which is calculated by the index calculation portion 11, using the threshold value and the value of the continuous function which continuously changes with reference to the threshold value. Thus, the risk index can be transformed to the value that continuously changes using the continuous function, and the risk index can be set properly.

Second Embodiment

Figure 5:
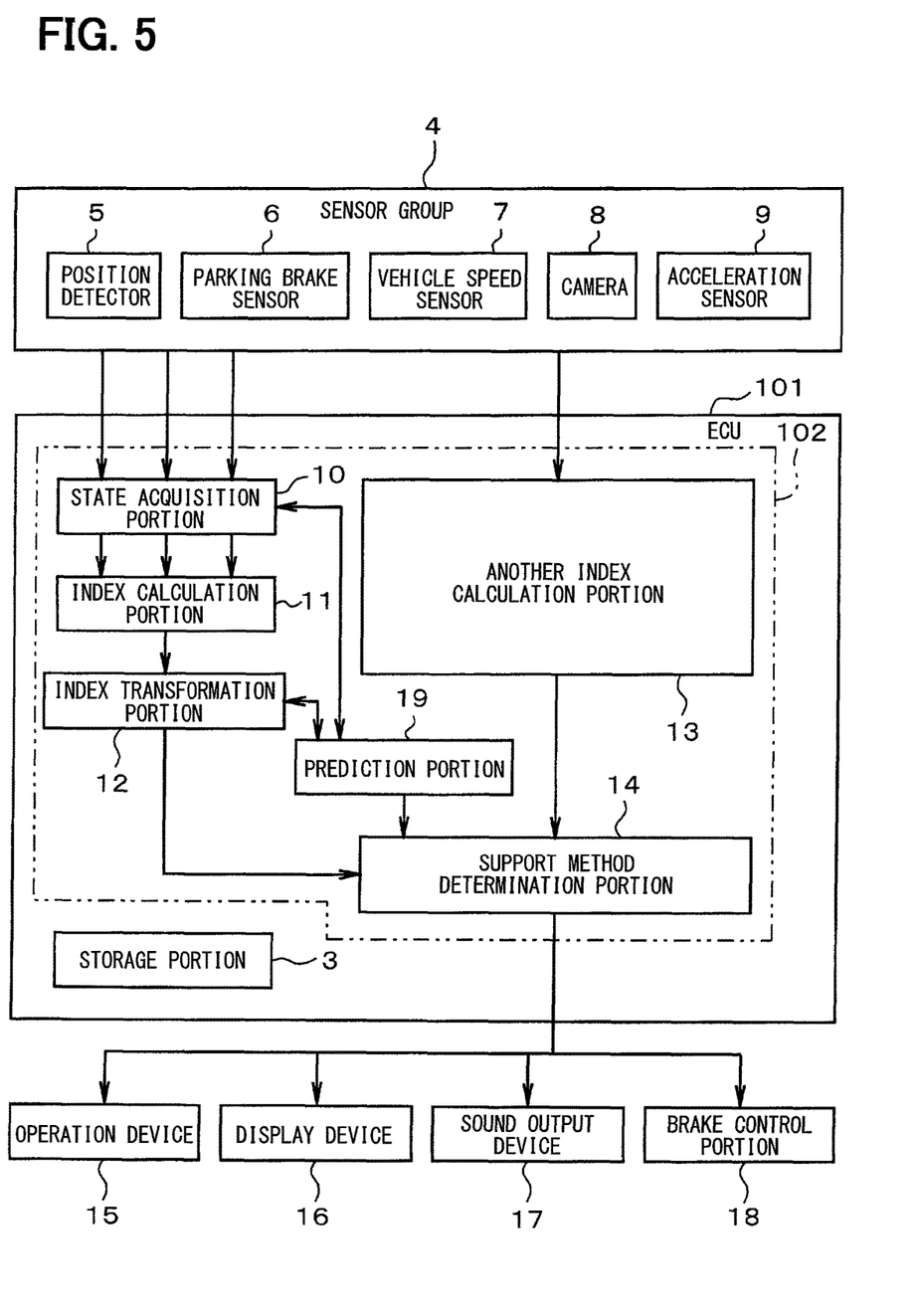
FIG. 5 is a block diagram schematically showing an electrical configuration according to a second embodiment of the present disclosure.
Figure 6:
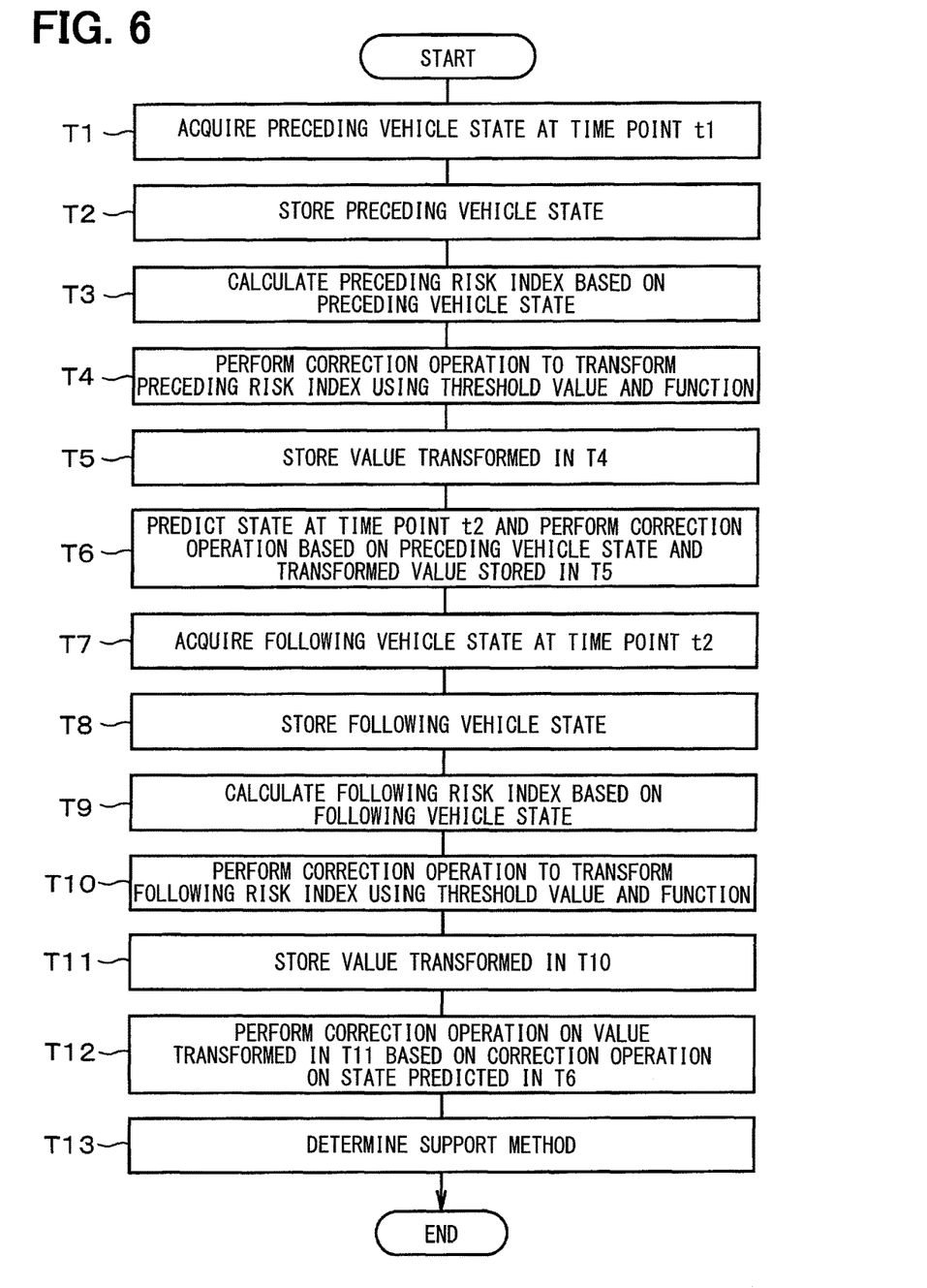
FIG. 6 is a flowchart schematically showing an operation.

FIG. 5 and FIG. 6 are additional drawings that show a second embodiment. An electronic control unit 101 instead of the electronic control unit 1 includes a control circuit 102 instead of the control circuit 2. The control circuit 102 includes the state acquisition portion 10, the index calculation portion 11, the index transformation portion 12, another index calculation portion 13, a prediction portion 19, and a support method determination portion 14. The control circuit 102 executes a corresponding program stored in the storage portion 3 in order to provide these portions as functional blocks with a hardware circuit as main configuration. The electronic control unit 101 differs from the electronic control unit 1 in terms of including the prediction portion 19. Thus, the prediction portion 19 will be described, and description of other blocks will be omitted.

The prediction portion 19 predicts that a present state changes to which state at a later support time point based on the vehicle state and the risk index transformed by the correction operation. The vehicle state may include the subject vehicle's velocity Vo, acceleration information, or the relative velocity Vr to the front vehicle. The prediction portion 19 predicts a correction operation at the later support time point. The prediction portion 19 predicts the state and performs the correction operation at the later time point using a value of the risk index that is transformed by the index transformation portion 12. The prediction portion 19 predicts the value in consideration of an earlier state by performing an efficient training that employs a learning method to which a logic, such as Bayes classifier is applied.

In one example, state A is defined as safe state, state B is defined as warning state, and state C is defined as hazardous state. In case that a state at a time point is recognized as the warning state B, it may be determined that danger approaches when the warning state B is changed from the earlier safe state A, and it may be determined that safe approaches when the warning state B is changed from the earlier hazardous state C. Thus, in case that the state at the time point is the warning state B, the support method may be distinguished between the case where the state approaches the hazardous state C and the case where the state recedes from the hazardous state C. That is, the index can be more reliable by calculating the value of the risk index in consideration of the earlier state.

The process of the operation will be described with reference to FIG. 6. The flowchart shown in FIG. 6 schematically shows process that is executed by the functional blocks shown in FIG. 5 in cooperation with each other. As shown in FIG. 6, in step T1, the state acquisition portion 10 acquires information of the subject vehicle state as earlier vehicle state based on the sensor information acquired from the sensor group 4. The information of the subject vehicle state may include the information of the subject vehicle's velocity Vo, the acceleration information, the distance D between the subject vehicle and the front vehicle, and the relative velocity Vr. Assume that the vehicle state of a time point t1, which is defined as the earlier vehicle state, is acquired. In step T2, the state acquisition portion 10 controls the storage portion 3 to store the information of the subject vehicle's state at the time point t1, that is, the earlier vehicle state.

In step T3, the index calculation portion 11 calculates the risk index as the earlier risk index based on the information of the subject vehicle's state at the time point t1. Various types of indexes, such as the risk perception index KdB which is formulated by equation 1, the distance D, the calculated value of the driving load, TTC, or the brake discriminant may be employed as the risk index.

In step T4, the index transformation portion 12 performs the correction operation to transform the calculated earlier risk index using the threshold value and the value of the function. The transformation operation is similar to the correction operation in step S3 of the first embodiment, so the description will be omitted. The function may employ the cumulative distribution function, such as the sigmoid function or the probability density function, such as the normal distribution. In step T5, the index transformation portion 12 controls the storage portion 3 to store the value transformed by the correction operation in step T4.

In step T6, the prediction portion 19 predicts a state and performs the correction operation at a time point t2 following to the time point t1 based on the earlier vehicle state and the value of the risk index which is transformed by the index transformation portion 12 in step T5 and stored in the storage portion 3. The earlier vehicle state may include the information of the subject vehicle's velocity Vo, the acceleration information of the subject vehicle, or the relative velocity Vr to the front vehicle each of which is acquired at the time point t1. With this configuration, the prediction portion 19 predicts that the present state changes to which state at the time point t2. In the correction operation, the probability density function may be employed. In this case, the prediction portion 19 calculates the transition of the state (for example, the safe state A, the warning state B, and the hazardous state C) and the probability at the later support time point t2 based on a traveling situation at the time point t1. That is, when the three states A to C are previously assigned, the prediction portion 19, at the time point t1, is capable of predicting the probabilities of the transition to one of the states A to C at the time point t2, which is known as state transition probability.

After the present time arrives at the later support time point t2, the steps T1 to T6 are repeated. That is, the state acquisition portion 10 acquires the information of the subject vehicle state as a later vehicle state based on the sensor information acquired from the sensor group 4. The information of the subject vehicle state may include the information of the subject vehicle's velocity Vo, the acceleration information, the distance D between the subject vehicle and the front vehicle, and the relative velocity Vr to the front vehicle. In step T8, the state acquisition portion 10 controls the storage portion 3 to store the information of the subject vehicle state. In step T9, the index calculation portion 11 calculates the risk index based on the information of the subject vehicle's state at the time point t2 as the later risk index. In step T10, the index transformation portion 12 performs the correction operation to transform the calculated later risk index using the threshold value and the continuous function whose value continuously changes with reference to the threshold value. In step T11, the index transformation portion 12 controls the storage portion 3 to store the value after the transformation. When the probability density function is employed, the calculated value after the transformation represents the state probability for one of the states A, B, and C.

In step T12, the index transformation portion 12 performs the correction operation on the value transformed in step T11 based on the correction operation which is the state predicted in step T6. When the probability density function is employed, the index transformation portion 12 is capable of reflecting the state transition probability at the time point t1 for changing to one of the states A, B, and C to the transformed value of the later risk index. With this operation, the transformed value in which the previously known index (for example, the risk perception index KdB) is employed can be calculated. The index transformation portion 12 conclusively calculates one value by multiplying and adding the transformed values and the scores, and the scores are changed based on each of the states A, B, and C. The calculation operation for the one value is similar to the calculation method described in the first embodiment.

The value transformed from the later risk index can be calculated with the state transition probability for changing to each of the states A, B, and C at the time point t1 and the state probability for existing in each of the states A, B, and C at the time point t2 reflected. The one value that reflects the earlier vehicle state and the later vehicle state can be calculated. The support method determination portion 14 determines the level of the risk degree (for example, the level of safe state, normal state, or hazardous state) based on the risk index transformed by the correction operation in step T12, and then, in step T13, determines the support method. The support method determination portion 14 controls the operation device 15, the display device 16, the sound output device 17, or the brake control portion 18 to perform the determined support method. Each device 15 to 18 may display the warnings in multiple levels, output the alarm sound in multiple levels, restrict the operation of the navigation device, or controls the brake. Each support method is performed based on the risk index transformed by the correction operation.

The value of the risk index can be corrected with consecutive prediction by repeating the steps T1 to T13 at the time points t1 and t2. With this configuration, the support method can be consecutively performed. In the present embodiment, the risk index at the time point t2 is calculated using the risk index at the immediate before time point t1. The determination of the support method is not limited to using the risk index at the immediate before time point t1. Alternatively, the support method may be determined using the risk index at a time point prior to the immediate before time point t1. That is, the support method may be determined using at least one vehicle state and the corresponding risk index calculated based on the vehicle state.

As described above, in the present embodiment, the later risk index at the time point t2 is transformed by the correction operation using the threshold value and the value of the function, and the value in which the later risk index is transformed by the correction operation is corrected based on the correction operation predicted by the prediction portion 19. With this configuration, the value that is transformed from the later risk index can be calculated with the state transition probability for changing to each of the states A, B, and C at the time point t1 and the state probability for existing in each of the states A, B, and C at the time point t2 reflected. The one value that reflects the earlier vehicle state and the later vehicle state is set to the risk index. Thus, the support method can be determined based on the value. With this configuration, the proper risk index can be set.

OTHER EMBODIMENT

The disclosure is not limited to configuration according to the embodiments described above. The disclosure can cover following modification and extension.

In the second embodiment, the value after the correction operation of the risk index is calculated based on the state transition probability at the earlier time point t1 and the state probability observed at the time point t2. The calculation operation is not limited to calculating the value after the correction operation of the risk index. Alternatively, after a state probability in consideration of the state at the past time point t1 is calculated based on the state transition probability at the earlier time point t1 and the state probability observed at the present time point t2, a value after the correction operation of the risk index may be calculated.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. A risk index transformation apparatus that sets a risk index for a drive assist, comprising:

a state acquisition portion configured to acquire a vehicle state;

an index calculation portion configured to calculate the risk index based on the vehicle state acquired by the state acquisition portion;

an index transformation portion configured to perform a correction operation to transform the risk index calculated by the index calculation portion using a threshold value and a value of a continuous function that continuously changes with reference to the threshold value, wherein the continuous function is provided by a probability density function or a cumulative distribution function; and a support method determination portion configured to control a device to execute a support method based on the risk index transformed by the index transformation portion using the correction operation, wherein the support method includes a display of warning in multiple levels, an output of alarm sound in multiple levels, or an operation restriction of a navigation device.

2. The risk index transformation apparatus according to claim 1 further comprising:

a storage portion configured to store the vehicle state acquired by the state acquisition portion; and a prediction portion, wherein the state acquisition portion acquires the vehicle state, which changes according to time, as an earlier vehicle state and a later vehicle state acquired at a time point after the earlier vehicle state, the state acquisition portion stores the earlier vehicle state and the later vehicle state in the storage portion, the index calculation portion calculates an earlier risk index based on the earlier vehicle state stored in the storage portion, the index calculation portion calculates a later risk index based on the later vehicle state stored in the storage portion, the prediction portion performs a correction operation by predicting a state at the later time point based on the earlier risk index calculated by the index calculation portion and the earlier vehicle state stored in the storage portion, the index transformation portion performs the correction operation to transform the later risk index using the threshold value and the value of the continuous function that continuously changes with reference to the threshold value, and the index transformation portion performs the correction operation on a value of the later risk index, which was transformed by the correction operation, based on the correction operation predicted by the prediction portion.

* * * * *